United States Patent
Li

(10) Patent No.: US 8,300,388 B2
(45) Date of Patent: Oct. 30, 2012

(54) ACCESSORY STRAP SECURING MECHANISM

(75) Inventor: Chang-Zhi Li, Shennzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 561 days.

(21) Appl. No.: 12/563,253

(22) Filed: Sep. 21, 2009

(65) Prior Publication Data

US 2010/0118476 A1 May 13, 2010

(30) Foreign Application Priority Data

Nov. 10, 2008 (CN) .......................... 2008 1 0305470

(51) Int. Cl.
*H05K 5/00* (2006.01)
*H05K 7/00* (2006.01)
*A45F 3/14* (2006.01)
*H04M 1/00* (2006.01)

(52) U.S. Cl. ................. 361/679.01; 224/254; 455/575.1
(58) Field of Classification Search ............. 361/679.01; 455/575.1; 224/254
See application file for complete search history.

(56) References Cited

U.S. PATENT DOCUMENTS 6,427,293 B1 * 8/2002 Bowes, Jr. ................... 24/304
2004/0203501 A1 * 10/2004 Johnson et al. ............. 455/90.3

* cited by examiner

*Primary Examiner* — Anthony Haughton
(74) *Attorney, Agent, or Firm* — Altis Law Group, Inc.

(57) ABSTRACT

An accessory strap securing mechanism is positioned on a portable electronic device to assemble an accessory strap thereon. The portable electronic device defines an assembling slot. The accessory strap securing mechanism includes a securing member and a holder. The securing member is received in the assembling slot. The securing member defines a space and includes a stopper portion and a latching portion. The latching portion defines two pin holes. The holder rotatably engages in the pin holes and is received in the space, and the holder has a position abutting the stopper portion.

1 Claim, 4 Drawing Sheets

ACCESSORY STRAP SECURING MECHANISM

BACKGROUND

1. Technical Field

The present disclosure relates to an accessory strap securing mechanism for a portable electronic device.

2. Description of Related Art

With the development of technologies, portable electronic devices such as mobile phones, MP3s, digital cameras and personal digital assistants (PDAs) are now in widespread use, and consumers may now enjoy the full convenience of high technology products almost anytime and anywhere.

Conventional portable electronic devices usually have an accessory strap securing mechanism disposed thereon to assemble the accessory strap. However, the small size of existing accessory strap securing mechanisms makes it difficult for the accessory strap to be assembled thereto.

Therefore, there is room for improvement within the art.

BRIEF DESCRIPTION OF THE DRAWING

Many aspects of the present accessory strap securing mechanism in electronic device can be better understood with reference to the following drawings. The components in the various drawings are not necessarily drawn to scale, the emphasis instead being placed upon clearly illustrating the principles of the present accessory strap securing mechanism in electronic device. Moreover, in the drawings, like reference numerals designate corresponding parts throughout the diagrams.

DETAILED DESCRIPTION OF THE EMBODIMENT

Figure 1:
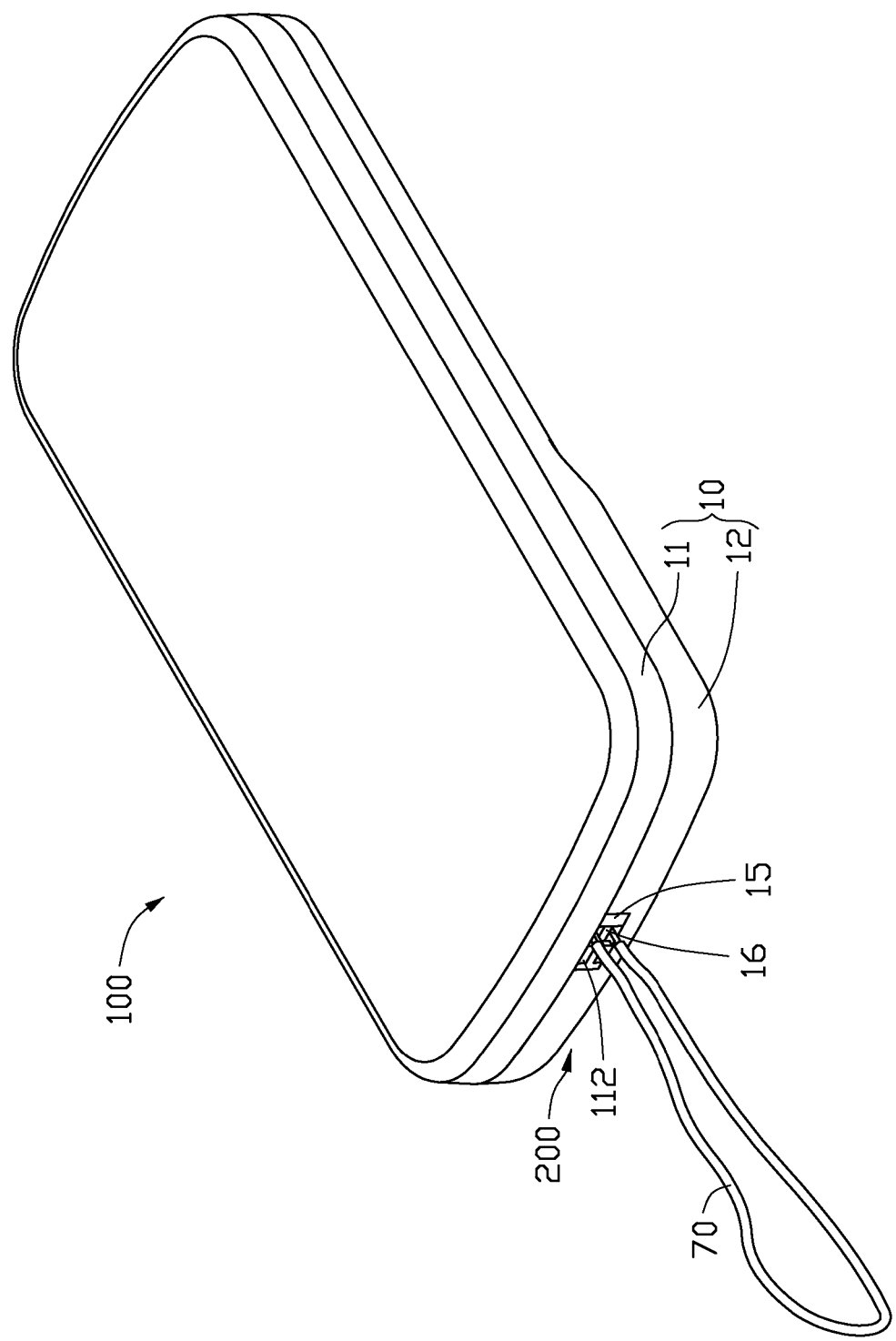
FIG. 1 shows an isometric view of a portable electronic device having an accessory strap assembled therewith in accordance with an exemplary embodiment.

Referring to FIG. 1, a portable electronic device 100 includes a main body 10 and an accessory strap securing mechanism 200 disposed thereon to assemble an accessory strap 70 thereto. The main body 10 may be a mobile phone, an MP3, a digital camera or a personal digital assistant (PDA), etc. The accessory strap securing mechanism 200 includes a securing member 15, a holder 16 and an assembling slot 18.

Figure 2:
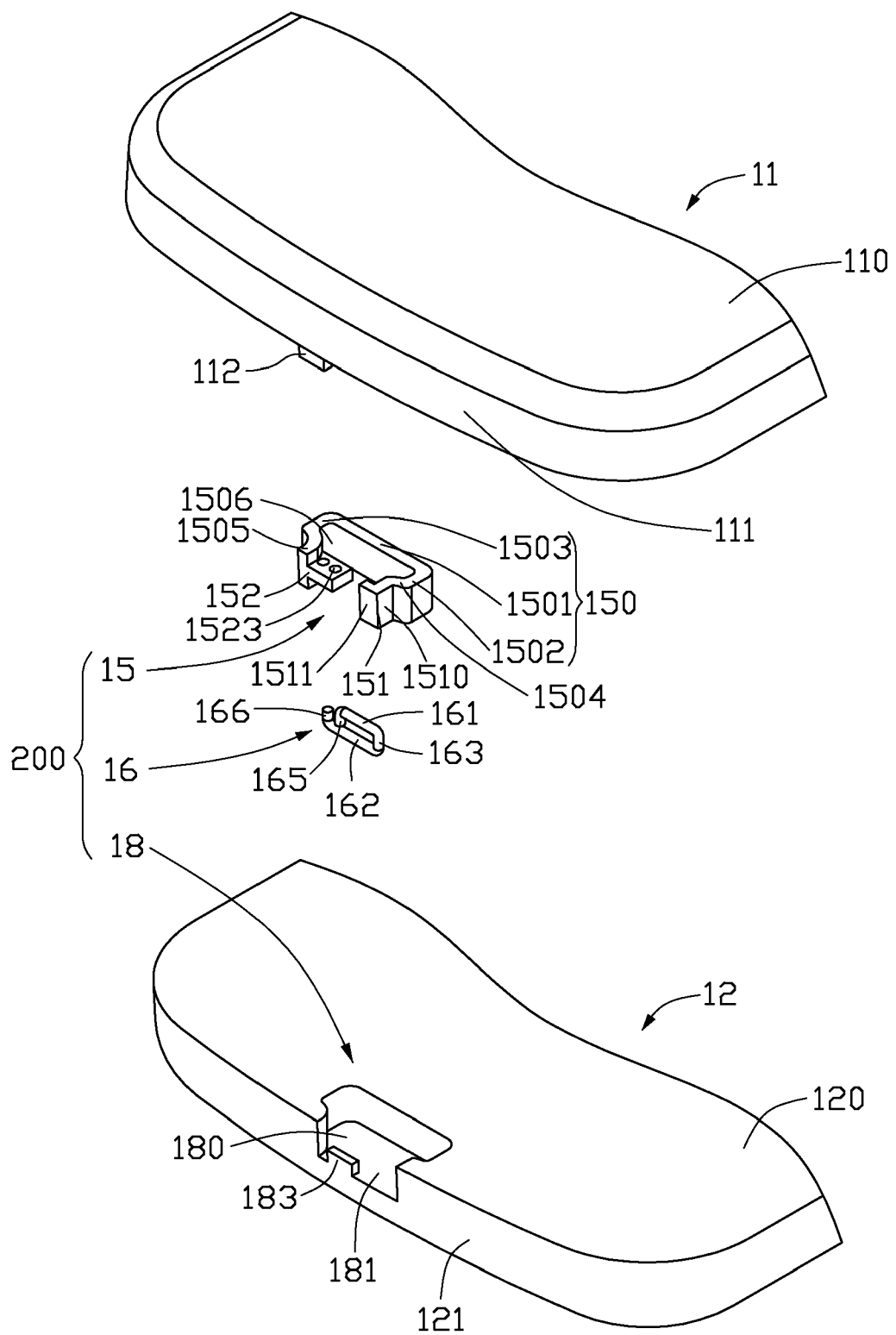
FIG. 2 is an exploded, isometric view of a portable electronic device shown in FIG. 1.
Figure 3:
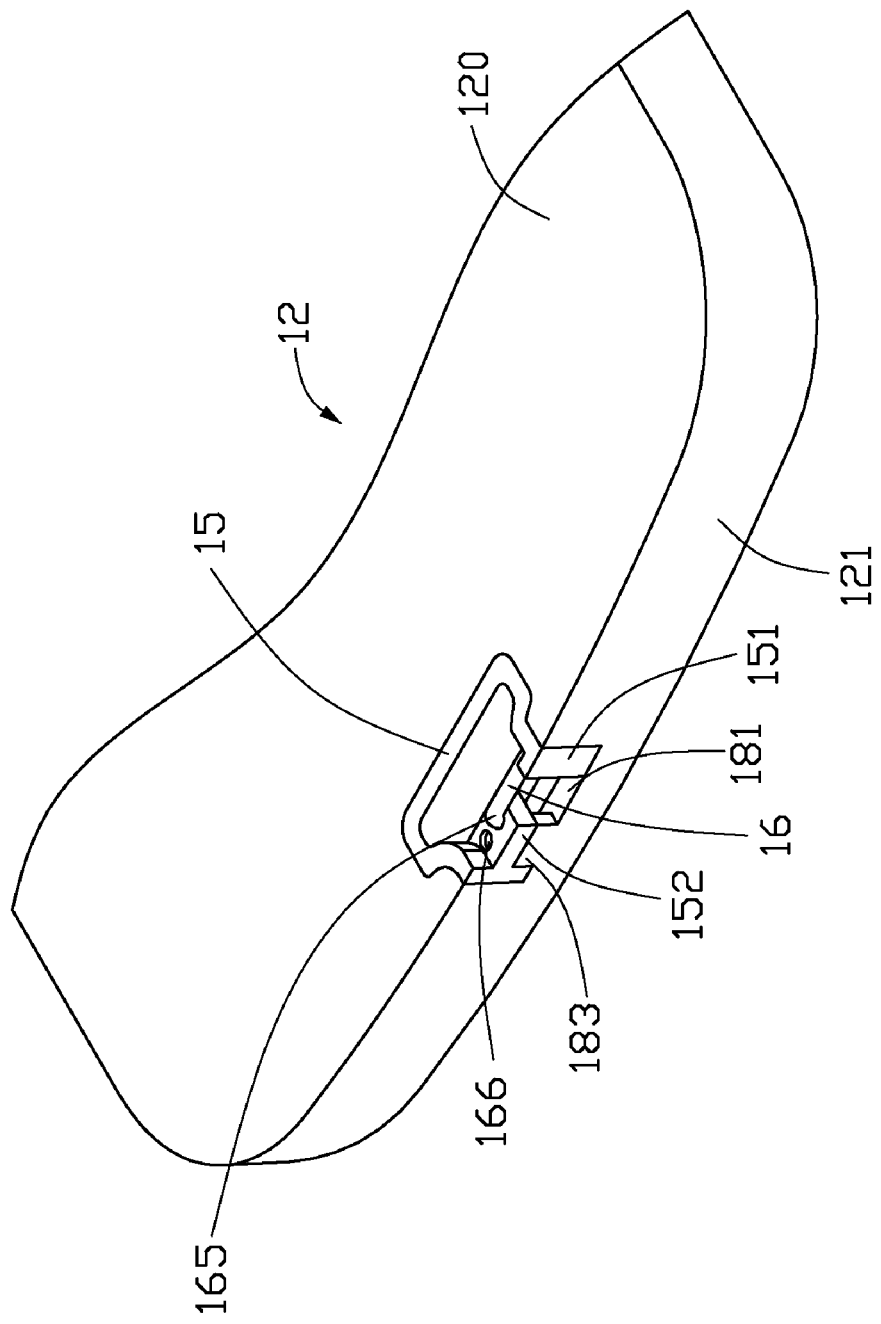
FIG. 3 is an assembled, isometric view of the assembly structure shown in FIG. 1.

Referring to FIGS. 2 and 3, in the exemplary embodiment, the main body 10 includes a housing member 11 and a cover member 12. The housing member 11 includes an upper wall 110 and a sidewall 111 extending from peripheral edge of the upper wall 111. A tab 112 protrudes from the side wall 111. The cover member 12 is detachably assembled with the housing member 11. The cover member 12 includes a top surface 120 and an end surface 121. The assembling slot 18 is defined in the cover member 12. The assembling slot 18 includes a groove 180 and an opening 181. The groove 180 is defined in the top surface 120. The opening 181 is defined in the end surface 121, and communicates with the groove 180. A projection 183 extends from the end surface 121 for engaging with the tab 112 of the housing member 11.

The securing member 15 is detachably assembled in the assembling slot 18. A cross section of the securing member 15, substantially corresponds to the cross-section of the assembling slot 18. The securing member 15 includes a main section 150, a stopper portion 151 and a latching portion 152. The main section 150 includes a main plate 1501 and two side plates 1502, 1503 extending from the main plate 1501. A curved plate 1505 extends from one side plate 1503, and a tilt plate 1504 extends from the other side plate 1504. The stopper portion 151 is connected with the tilt plate 1504. The main plate 1501, two side plates 1502, 1503, the curved plate 1505, and the stopper portion 151 cooperatively define a space 1506. The stopper portion 151 is substantially L-shaped, and includes a first portion 1510 and a second portion 1511. The latching portion 152 longitudinally extends from the curved plate 1505, and defines two spaced-apart pin holes 1523.

The holder 16 includes a first rod portion 161, a second rod portion 162 and a connecting rod portion 163. The first rod portion 161 is shorter than the second rod portion 162. A distal end of the first rod portion 161 is bent downward to form a first pin end 165. A distal end of the second rod portion 162 is bent upward to form a second pin end 166. The first pin end 165 and the second pin end 166 are spaced apart to respectively be inserted into the pin holes 1523. In this embodiment, the holder 16 is made of rubber.

Referring to FIG. 3, during assembly of the accessory strap securing mechanism 200, firstly, the first pin end 165 and the second pin end 166 of the holder 16 are inserted into the two pin holes 1523 of the securing member 15 for rotatably connecting the holder 16. Then, the securing member 15 with the holder 16 is assembled in the groove 180. The projection 183 abuts the latching portion 152. The opening 181 communicates with the space 1506. Finally, the housing member 11 is attached to the cover member 12, and the tab 112 resists the latching portion 152 for tightly abutting the securing member 15. The holder 16 abuts the stopper portion 151 to limit the rotation of the holder 16.

Figure 4:
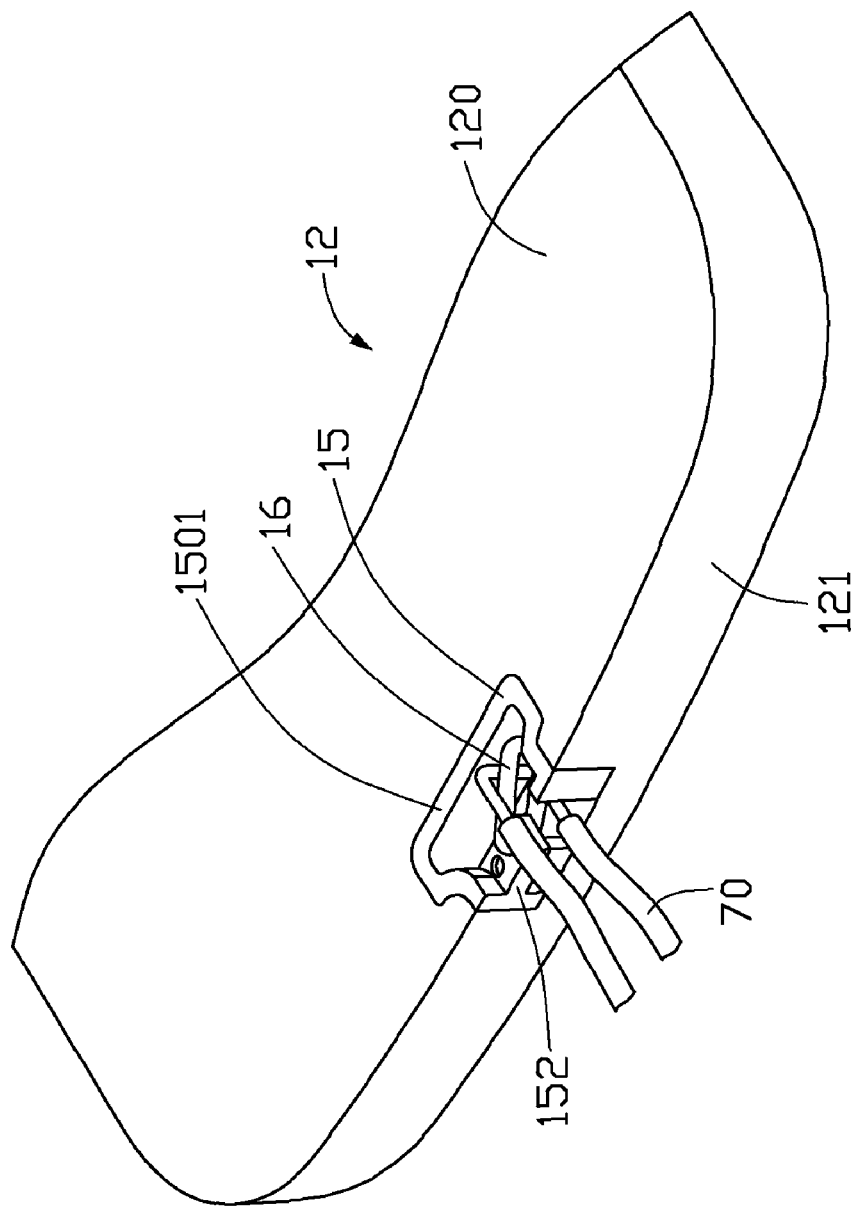
FIG. 4 is an assembled, isometric view of the assembly structure shown in FIG. 1 during assembly.

Referring to FIG. 4, when assembling the accessory strap 70, the holder 16 is pushed inward to allow the first pin end 165 and the second pin end 166 to rotate relative to the latching portion 152. The holder 16 pivots away from the stopper portion 151, and is twisted to produce an elastic force. At that time, the accessory strap 70 is inserted from the opening 181, and is placed around the holder 16. After the holder 16 is released, the holder 16 resumes to abut the stopper portion 151 under the role of the elastic force. Accordingly, the accessory strap 70 is attached to the mobile phone 100. It is easy to operate and assemble the accessory strap 70 quickly and conveniently.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An accessory strap securing mechanism positioned on a portable electronic device to assemble an accessory strap thereon, the portable electronic device defining an assembling slot, the accessory strap securing mechanism comprising:

a securing member being received in the assembling slot, the securing member defining a space and including a stopper portion and a latching portion, the latching portion defining two pin holes, the axes of the pin hole parallel with each other; and a holder including a first rod portion, a second rod portion, a connecting rod portion, a first pin end and a second pin end extending along reverse directions, the first rod portion and the second rod portion being parallel with each other, and the first rod portion being shorter than the second rod portion, the first pin end and the second pin end being cylindrical, the first pin end extending downward, and the second pin end extending upwards, the first pin end and the second end respectively rotatably engaging in the pin holes and being received in the space, and the holder having a position abutting the stopper portion.

* * * * *